United States Patent
Kuschnerus et al.

(10) Patent No.: US 12,055,425 B2
(45) Date of Patent: Aug. 6, 2024

(54) METHOD FOR FILLING A TARGET VOLUME INTO A CONTAINER, MEASURING ARRANGEMENT AND FLOWMETER

(71) Applicant: KROHNE Messtechnik GmbH, Duisburg (DE)

(72) Inventors: Dirk Kuschnerus, Krefeld (DE); Christopher Lüke, Gelsenkirchen (DE); Hansjörg Mucke, Mönchengladbach (DE); Sven Walbrecker, Wurster Nordseeküste (DE)

( * ) Notice: Subject to any disclaimer, the term of this patent is extended or adjusted under 35 U.S.C. 154(b) by 0 days.

(21) Appl. No.: 18/164,265

(22) Filed: Feb. 3, 2023

(65) Prior Publication Data

US 2023/0249855 A1 Aug. 10, 2023

(30) Foreign Application Priority Data

Feb. 4, 2022 (DE) ..................... 10 2022 102 669.8

(51) Int. Cl.
| | |
|---|---|
| *G01F 13/00* | (2006.01) |
| *B65B 3/36* | (2006.01) |
| *B67C 3/28* | (2006.01) |
| *G01F 11/28* | (2006.01) |
| *G01F 1/00* | (2022.01) |

(52) U.S. Cl.
CPC .............. *G01F 13/006* (2013.01); *B65B 3/36* (2013.01); *B67C 3/287* (2013.01); *G01F 11/28* (2013.01); *G01F 1/00* (2013.01)

(58) Field of Classification Search
CPC .... B65B 3/34; B65B 3/36; B67C 3/28; B67C 3/287; G01F 13/00; G01F 13/006; G01F 11/28; G01F 1/00; G01F 23/00
See application file for complete search history.

(56) References Cited

U.S. PATENT DOCUMENTS

| | | | |
|---|---|---|---|
| 8,863,986 B2 * | 10/2014 | Randall, Jr. ........... | G01F 11/284 222/64 |
| 10,035,691 B2 * | 7/2018 | Malmberg ............ | B65B 39/001 |
| 10,131,527 B2 * | 11/2018 | Fickert ..................... | B67C 3/26 |
| 10,710,862 B2 * | 7/2020 | Clüsserath ............ | B65B 57/145 |

(Continued)

FOREIGN PATENT DOCUMENTS

| | | |
|---|---|---|
| CA | 2769211 | 4/2012 |
| DE | 10 2005 035 264 | 2/2007 |

(Continued)

*Primary Examiner* — Nicolas A Arnett
(74) *Attorney, Agent, or Firm* — Patrick D. Duplessis

(57) ABSTRACT

A method for filling a target volume into a container by means of a measuring arrangement is described and illustrated. The measuring arrangement includes at least one flowmeter for measuring the flow of a medium flowing into the container, at least one actuator and at least one control unit. The flowmeter includes a computing unit. The filling process can be started and ended by actuating the actuator. The control unit is connected to the actuator and the flowmeter via a communication system. The control unit is set up in such a way that, during operation, it sends a control command to the actuator to end the filling process when a defined limit value of the fill volume, which correlates with the target volume, is reached.

11 Claims, 2 Drawing Sheets

(56) References Cited

U.S. PATENT DOCUMENTS

| | | | |
|---|---|---|---|
| 10,981,681 B2* | 4/2021 | Kurosawa | ............... B65B 57/10 |
| 11,312,514 B2* | 4/2022 | Küng | ........................ B65B 3/34 |
| 2005/0274200 A1* | 12/2005 | Henry | ..................... G01F 1/849 |
| | | | 73/861.356 |
| 2010/0192521 A1* | 8/2010 | Clusserath | ................ B67C 3/28 |
| | | | 53/503 |
| 2019/0100423 A1 | 4/2019 | Clusserath et al. | |
| 2022/0136877 A1* | 5/2022 | Kuschnerus | ............ G01F 25/10 |
| | | | 73/861.08 |

FOREIGN PATENT DOCUMENTS

| | | |
|---|---|---|
| DE | 102016107622 A1 | 10/2017 |
| DE | 102019114488 A1 | 12/2020 |
| WO | 2005108277 | 11/2005 |

* cited by examiner

METHOD FOR FILLING A TARGET VOLUME INTO A CONTAINER, MEASURING ARRANGEMENT AND FLOWMETER

TECHNICAL FIELD

The invention is based on a method for filling a target volume into a container, by means of a measuring arrangement, wherein the measuring arrangement comprises at least one flowmeter for measuring the flow of a medium flowing into the container, at least one actuator and at least one control unit
wherein the flowmeter comprises a computing unit,
wherein the filling process can be started and ended by activating the actuator,
wherein the control unit is connected to the actuator and the flowmeter via a communication system, and wherein the control unit is arranged to send, during operation, a control command to the actuator to terminate the filling operation when a predetermined limit value of the fill volume correlating with the target volume is reached.

Furthermore, the invention relates to a measuring arrangement for filling a target volume into a container, comprising at least one flowmeter for measuring the flow rate of a medium flowing into the at least one container, comprising at least one actuator, comprising at least one control unit,
wherein the flowmeter comprises a computing unit,
wherein the filling process can be started and ended by activating the actuator,
wherein the control unit is connected to the actuator and the flowmeter via a communication system, and wherein the control unit is set up in such a way that, during operation, it sends a control command to the actuator to terminate the filling process when a fixed limit value of the fill volume, which correlates with the target volume, is reached.

Furthermore, the invention relates to a flowmeter for use in a measuring arrangement according to the invention.

The present invention relates to the use of flowmeters in applications in which a volume or mass is metered. A particular example of use is the metering of a predetermined target volume through valves in beverage filling. Due to the practically limited sampling rate of a meter and the run time of the data transmission between the central control unit and the valve or meter, there is a delay in the shutdown of the filling process. This quantization in time leads to overfilling, since additional medium escapes between the ideal and delayed shutoff time of the valve. The overfill is at a maximum when the last sampled measured value just does not lead to the target volume being reached and at a minimum when the last sampled measured value is just sufficient for this.

BACKGROUND

In a digitized process engineering system, the flowmeters and the actuators are connected to a central control unit by digital, packet-based fieldbuses. Based on the received measured values of the flowmeters, the control unit decides whether and how a control intervention by the actuators is necessary. The limited sampling rate of the measuring devices and the finite run times of the data transmission lead to a deviation from ideal behavior. As a rule, a control unit can be designed in such a way that it controls the filling process with tolerable errors despite non-ideal behavior. One way of minimizing the error described above is to reduce the sampling rate of the measuring devices and the run times of the data transmission by increasing the use of hardware until a satisfactory result is achieved.

In the case of metering a target volume, non-deterministic errors occur in addition to these deterministic errors. These are based on the fact that the time at which the desired target volume is reached has no fixed correlation with the transmission cycle of the filling messages of the flowmeters, but depends on continuous, fluctuating process variables.

With a sufficiently small step size or high sampling rates, the non-deterministic error can also theoretically be reduced as desired. However, this approach leads to disproportionately increasing costs due to higher-value hardware and is limited by the technical possibilities beyond a certain point. For this reason, such a procedure is not expedient or, in some cases, not feasible for all applications.

DE 103 07 672 A1 relates to a method for filling a medium into a container, wherein the medium is filled in several filling steps, in that in a first filling step the filling is interrupted by closing a valve in order to determine the overflow of the medium occurring during the closing of the valve, and wherein the final value for the end of the filling process is determined taking into account the overflow.

In addition, a method for filling a medium into a container is known from DE 2019 125 329 A1, wherein the container is filled abruptly, so that it is not possible to monitor the filling process in the sense of regularly capturing the current fill volume. To improve the accuracy of the filling process, influencing variables which affect a target quantity of the filling, in particular the fill level, are captured and taken into account when setting the filling parameters.

SUMMARY

Based on the described prior art, the object of the invention is to provide a method for filling a target volume so that non-deterministic overfilling can be reduced. Furthermore, the object of the invention is to provide a corresponding measuring arrangement for carrying out the method according to the invention and a flowmeter for the measuring arrangement.

According to a first teaching of the present invention, the previously set forth object is achieved by a method described at the beginning for filling a medium in that the method comprises the following steps:
starting the filling process,
calculating the current fill volume by integrating the measured flow measurement values by the calculation unit of the flowmeter,
sending a fill message at defined time intervals with the current fill volume from the flowmeter to the control unit,
predicting the remaining time until the fill volume limit value is reached by the flowmeter's calculation unit,
checking by the computing unit of the flowmeter whether the limit value of the fill volume is reached in time before the next fill message of the flowmeter is sent,
if the limit value of the fill volume is reached in time before the next fill message of the flowmeter is sent, sending an additional message with the limit value of the fill volume at a predicted time in time before the next fill message to the control unit, and
ending the filling process by a control command from the control unit.

According to the invention, it has been recognized that the accuracy of the filled target volume can be improved in that, as an alternative to increasing the sampling rate, a prediction is made by the computing unit of the flowmeter as to when the limit value of the fill volume for ending the filling process will be reached, and in that, depending on this prediction, an additional message is transmitted at the appropriate time, in particular outside the transmitting frequency of the flowmeter, so that the actuator can be actuated as close as possible to reaching the target volume for ending the filling process.

If the actuator is designed as a valve, according to one design, the filling process is started, for example, by opening the valve. The flowmeter recognizes that the filling process is starting or it is informed of this by the control unit.

According to one design of the method, the fill messages are sent to the control unit at a regular, i.e. constant, interval. Alternatively, the interval for sending the individual fill messages can also change in the course of the filling process. For example, it is conceivable that no fill message is sent until the container has half the fill volume and that, from this point on, a fill message is sent either regularly or at intervals that shorten in time.

Particularly preferably, the transmitting frequency with which the at least one flowmeter sends fill messages to the control unit corresponds to the sampling rate of the flowmeter.

Particularly preferably, the computing unit for determining the current fill volume takes into account at least one further process variable in addition to the measured flow rate, for example the viscosity and/or the temperature and/or the pressure of the medium to be filled. According to this design, at least one further sensor is provided for capturing the at least one further process variable. This design has the advantage that the determination of the current fill volume is particularly accurate. In particular, according to this design, it is taken into account that the filling process is subject to fluctuations which are due to fluctuations of process variables such as, for example, the viscosity and/or the temperature and/or the pressure of the medium.

According to one design, the prediction of the remaining time until the limit value of the fill volume is reached is carried out based on the assumption that the flow rate corresponds to the last measured value and remains constant. Alternatively, the prediction of the remaining time until the limit value of the fill volume is reached can also be determined considering a plurality of measured flow values, for example based on an averaging of the measured flow values.

Particularly preferably, the filling process is terminated by closing the actuator designed as a valve.

According to one design, the limit value of the fill volume can be the target volume. According to another design, the limit value is lower than the target volume, wherein preferably the difference to the target volume takes into account a overflow of the medium into the container due to the transmission time of the data transmission and/or the reaction time of the control unit and/or the reaction time of the actuator.

According to a further design of the method, the additional message is transmitted taking into account the transmission duration of the data transmission and/or the reaction time of the control unit and/or the reaction time of the actuator.

Particularly preferably, the additional message with the limit value of the fill volume is sent chronologically before the limit value of the fill volume is reached, wherein the time difference takes into account the transmission duration of the data transmission and/or the reaction time of the control unit and/or the reaction time of the actuator.

Particularly preferably, the flowmeter sends the additional message with the limit value of the fill volume at the predicted time without having actually captured this limit value by measurement. This design allows that the sending of the additional message is not bound to the sampling rate of the flowmeter.

According to a next design of the method, the additional message is sent at the latest at the time when the target volume is reached, preferably in time before the target volume is reached.

Furthermore, it is preferred if the additional message is sent with increased priority. This ensures that if further messages, in particular further fill messages, are sent in the communication link between the flowmeter and the control unit, the relevant additional message is transmitted to the control unit with priority. In particular, in a measuring arrangement in which there are a plurality of filling points at which further flowmeters and actuators are arranged which communicate with the control unit, the filling at the individual filling points is thus particularly accurate.

According to a further advantageous design of the method, at least one fill message from the flowmeter is omitted, preferably so that the additional message can be sent at the predicted time. For example, if it is determined that the limit value of the fill volume will be reached shortly after the following fill message is sent, it is conceivable that the following fill message is omitted so that the additional message with the relevant limit value of the fill volume can be sent a short time later.

According to a next advantageous design of the method according to the invention, a plurality of flowmeters and a plurality of actuators are present, wherein the control unit is connected to the plurality of flowmeters and the plurality of actuators by the communication system, and wherein, if a flowmeter transmits an additional message outside its transmitting frequency, this additional message is transmitted in a prioritized manner. This design ensures that a particularly accurate filling of the target volume is carried out at each filling point while avoiding or minimizing overfilling.

Prioritization also means that if a flowmeter sends an additional message outside its transmitting frequency, the remaining flowmeters do not send colliding fill messages, so that the remaining flowmeters omit or delay individual fill messages to avoid collisions.

According to one design, if the plurality of flowmeters and the plurality of actuators are connected to the control unit via a common communication system, it is also advantageous for the flowmeters to send only additional messages to the control unit when the respective limit value is reached. This design minimizes the probability of collisions occurring in the communication system with additional messages from the individual flowmeters.

Alternatively, the communication system can also be designed in such a way that at least the flowmeters are each connected separately to the control unit, so that no collisions can occur with messages from other flowmeters.

According to a second teaching of the present invention, the object set forth at the outset is achieved by a measuring arrangement described at the outset for filling a target volume in that the control unit and the computing unit are designed to carry out one of the methods described above.

All explanations concerning the designs of the method also apply to the measuring arrangement according to the invention and vice versa.

According to a first advantageous design of the measuring arrangement, the at least one actuator is designed as a valve and/or the communication system is designed as a fieldbus or as a wireless connection.

According to a particularly preferred design, there is a plurality of filling points, each having a flowmeter and an actuator, wherein the control unit is connected to the plurality of flowmeters and the plurality of actuators of the plurality of filling points via the communication system. According to this design, the control unit controls a plurality of filling points, wherein each filling point can be individually controlled according to the method described previously. This ensures that the filling of the medium at all filling points is particularly accurate.

According to one design, the flowmeters are connected to the control unit via a common communication system. According to this design, additional messages are preferably transmitted with increased priority to ensure the improvement of the accuracy of the filling process at the individual filling points.

According to an alternative design, the individual flowmeters can communicate separately with the control unit. According to this design, collisions with additional messages can be avoided.

Particularly preferably, the individual flowmeters carry out a method described above independently at each filling point. In this way, particularly accurate filling of the target volume can be ensured at each filling point.

According to a third teaching of the present invention, the objective set forth at the outset is achieved by a flowmeter for use in one of the measuring arrangements described above. In detail, the flowmeter has for this purpose a computing unit which is designed for carrying out one of the methods described above and for communicating with a control unit according to the invention. With regard to the further advantageous designs of the flowmeter, reference is made to the above explanations.

BRIEF DESCRIPTION OF THE DRAWINGS

There is now a plurality of possibilities for designing and further developing the method according to the invention, the measuring arrangement according to the invention and the flowmeter according to the invention. For this purpose, reference is made to the description of preferred embodiments in conjunction with the drawings.

DETAILED DESCRIPTION

Figure 1:
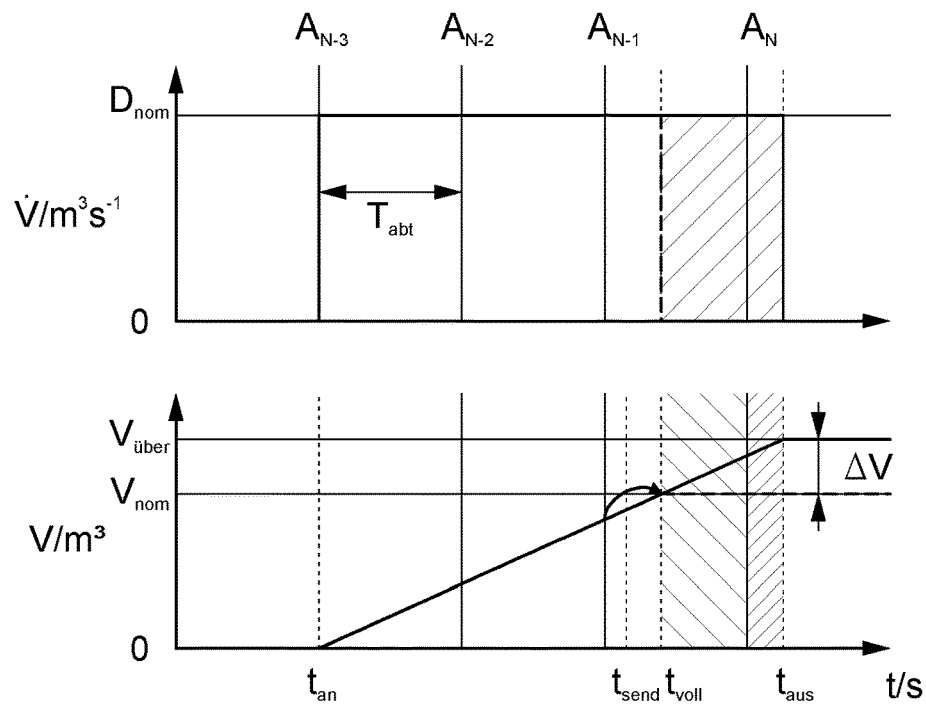
FIG. 1 illustrates a schematic representation of the time course of the filling process according to the invention.

FIG. 1 shows a schematic representation of the time course of a filling process according to the invention. The upper figure shows the time course of the flow $D_{nom}$, which is captured at the times $A_{N-3}$ to $A_N$. It can be seen that the time at which the target volume is reached lies between the times $A_{N-1}$ and $A_N$. Thus, if the flow and insofar the current fill volume is determined only at time $A_N$ again, the container to be filled will already be overfilled. In addition, it must be taken into account that the process of ending the filling process also includes a dead time and/or a reaction time of the valve, which results in further overfilling.

The lower figure shows the idea of the invention in that at the time $A_{N-1}$ the time $t_{voll}$, at which the target volume is reached, is predicted by the calculation unit of the flowmeter. Taking into account the previously mentioned dead time and/or reaction time of the valve, the additional message with the content that the target volume has been reached is sent beforehand at the time $t_{send}$, so that the valve is actuated as close as possible to the actual time when the target volume is reached.

As a result, the accuracy of the filling process can be significantly improved without having to increase the sampling rate of the flowmeter.

Figure 2:
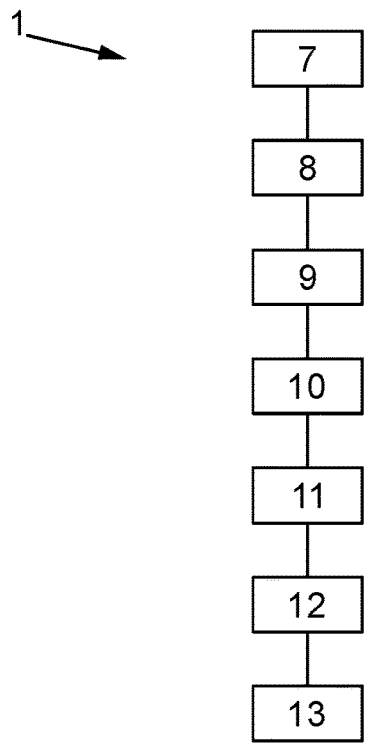
FIG. 2 illustrates a first embodiment of the method according to the invention.

FIG. 2 shows a first embodiment of the method 1 according to the invention for filling a target volume into a container 3, with a measuring arrangement 14, wherein the measuring arrangement 14 comprises at least one flowmeter 2 for measuring the flow rate of a medium flowing into the container 3, at least one actuator 5 and at least one control unit 6 wherein the flowmeter 2 comprises a computing unit 4,
wherein the filling process can be started and ended by activating the actuator 5,
wherein the control unit 6 is connected to the actuator 5 and the flowmeter 2 via a communication system, and wherein the control unit 6 is set up in such a way that, during operation, it sends a control command to the actuator 5 to terminate the filling process when a defined limit value correlating with the target volume is reached. In detail, the actuator 5 is designed as a valve.

The illustrated method 1 has the following steps:
starting the filling process 7 by opening the valve,
calculating the current fill volume 8 by integrating the measured flow measurement values by the calculation unit of the at least one flowmeter,
regularly transmitting a fill message 9 in a transmitting frequency with the current fill volume from the flowmeter 2 to the control unit 6,
predicting the remaining time until the limit value is reached 10 by the computing unit 4 of the flowmeter 2,
checking by the computing unit 4 of the flowmeter 2 whether the limit value is reached in time before the next fill message of the at least one flowmeter 2 11,
if the limit value is reached in time before the next fill message of the at least one flowmeter 2, sending an additional message 12 with the limit value at a predicted time in time before the next fill message to the control unit 6, wherein the additional message is sent in time before the limit value is actually reached,
ending the filling process 13 upon command of the control unit by closing the valve.

If the limit value is not reached in time before the next fill message, the next flow measurement value or the next value of the current fill volume is determined according to plan with the transmitting frequency, for example with the sampling rate, and communicated to the control unit 6 in a fill message.

Figure 3:
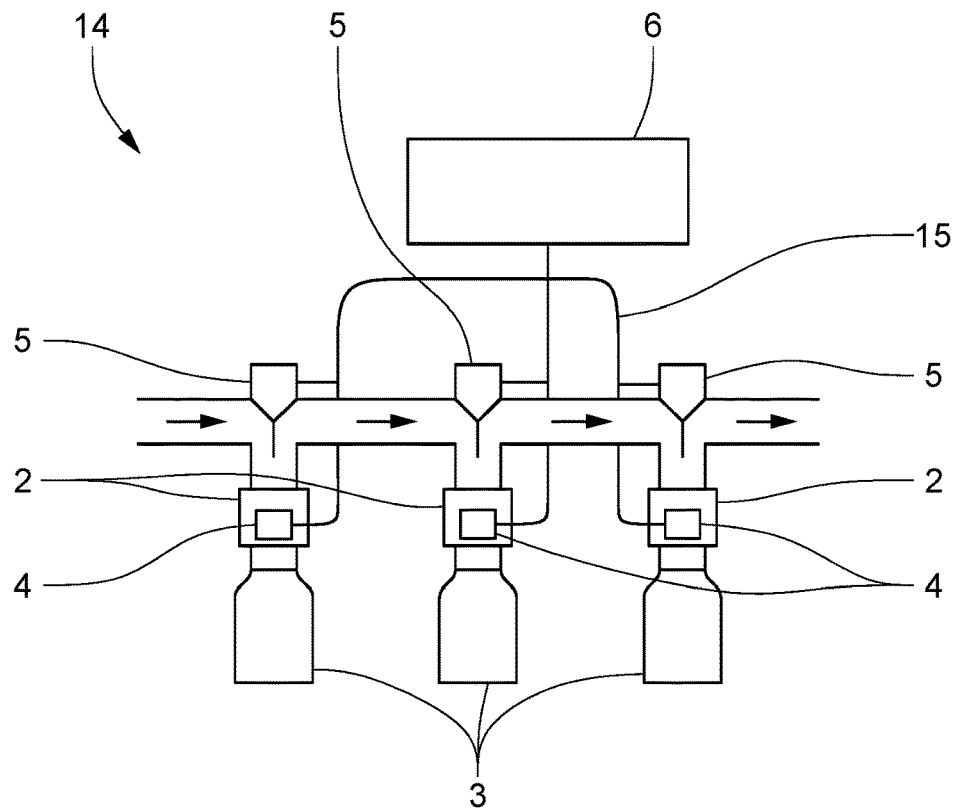
FIG. 3 illustrates a first embodiment of the measuring arrangement according to the invention with flowmeters according to the invention.

FIG. 3 shows a first embodiment of the measuring arrangement 14 according to the invention with flowmeters 2 according to the invention and with actuators designed as valves, wherein a filling process can be started and also ended with the valves.

The control unit 6 is connected to the valves and the flowmeters 2 via a communication system 15, which is designed as a fieldbus in the embodiment shown. The fieldbus can also have a geometry other than that shown.

During operation, the control unit 6 sends commands to close the individual valves when the associated containers are at their target volume.

The flowmeters 2 shown are now set up in such a way that, according to the invention, they predict the time at which the target volume or the limit value for ending the filling process is reached and, taking into account reaction times and/or dead times of other components of the measuring arrangement 14, transmit the additional message that the target volume or the limit value has been reached to the control unit 6.

The measuring arrangement 14 shown thus exhibits a particularly high measuring accuracy of the filled target volumes.

Figure 4:
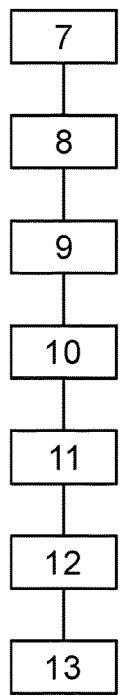
FIG. 4 illustrates a second embodiment of a method according to the invention.

FIG. 4 shows a second embodiment of the method 1 according to the invention, wherein the control unit 6 is connected to a plurality of flowmeters 2 and a plurality of valves, as shown in FIG. 3.

Each flowmeter 2 carries out steps 7 to 11, already described, on its own. Provided that a flowmeter 2 then sends an additional message 12, this additional message has an increased priority.

Subsequently, the filling process is terminated at the filling point at which the additional message was sent 13. The method 1 shown ensures, in this respect, that even in a measuring arrangement with different filling points, the target volume can be metered particularly accurately at each filling point.

The invention claimed is:

1. A method for filling a target volume into a container by means of a measuring arrangement, wherein the measuring arrangement includes at least one flowmeter for measuring the flow of a medium flowing into the container, at least one actuator and at least one control unit, wherein the flowmeter comprises a computing unit, wherein the filling process can be started and ended by activating the actuator, wherein the control unit is connected to the actuator and the flowmeter via a communication system, and wherein the control unit is set up in such a way that, during operation, it sends a control command to the actuator to terminate the filling operation when a defined limit value of the fill volume, which correlates with the target volume, is reached, the method comprising the following steps:
   starting the filling process;
   calculating the current fill volume by integrating the measured flow measurement values by the computing unit of the flowmeter;
   sending a fill message at defined time intervals with the current fill volume from the flowmeter to the control unit;
   predicting the remaining time until the fill volume limit is reached by the computing unit of the flowmeter;
   checking by the computing unit of the flowmeter whether the limit value of the fill volume is reached in time before the next fill message of the flowmeter is sent;
   if the limit value of the fill volume is reached in time before the next fill message of the flowmeter is sent, sending an additional message with the limit value of the fill volume at a predicted time in time before the next fill message to the control unit; and
   ending the filling process by a control command from the control unit.

2. The method according to claim 1, wherein the additional message is sent taking into account the transmission duration of the data transmission and/or the reaction time of the control unit and/or the reaction time of the actuator.

3. The method according to claim 1, wherein the additional message is sent in time before the limit value of the fill volume is reached; and
   wherein the time difference takes into account the transmission duration of the data transmission and/or the reaction time of the control unit and/or the reaction time of the actuator.

4. The method according to claim 1, wherein the additional message is sent at the latest at the time at which the target volume is reached in time before the target volume is reached.

5. The method according to claim 1, wherein the additional message is sent with increased priority.

6. The method according to claim 1, wherein at least one fill message of the flowmeter is omitted.

7. The method according to claim 1, wherein a plurality of flowmeters and a plurality of actuators are present; and
   wherein the control unit is connected to the plurality of flowmeters and to actuators by the communication system, and that, insofar as a flowmeter transmits an additional message outside its transmitting frequency, this additional message is transmitted in a prioritized manner.

8. A measuring arrangement for filling a target volume into a container, comprising:
   at least one flowmeter for measuring the flow of a medium flowing into the at least one container;
   at least one actuator;
   at least one control unit;
   wherein the flowmeter has a computing unit; and
   wherein the filling process can be started and ended by activating the actuator;
   wherein the control unit is connected to the actuator and the flowmeter via a communication system, and the control unit is set up in such a way that, during operation, it sends a control command to the actuator to terminate the filling process when a defined limit value of the fill volume, which correlates with the target volume, is reached; and
   wherein the control unit and the computing unit of the flowmeter are designed and set up for carrying out a method including the steps of:
   starting the filling process;
   calculating the current fill volume by integrating the measured flow measurement values by the computing unit of the flowmeter;
   sending a fill message at defined time intervals with the current fill volume from the flowmeter to the control unit;
   predicting the remaining time until the fill volume limit is reached by the computing unit of the flowmeter;
   checking by the computing unit of the flowmeter whether the limit value of the fill volume is reached in time before the next fill message of the flowmeter is sent;
   if the limit value of the fill volume is reached in time before the next fill message of the flowmeter is sent, sending an additional message with the limit value of the fill volume at a predicted time in time before the next fill message to the control unit; and
   ending the filling process by a control command from the control unit.

9. The measuring arrangement according to claim 8, wherein the at least one actuator is designed as a valve and/or that the communication system is designed as a fieldbus or as a wireless connection.

10. The measuring arrangement according to claim 8, wherein a plurality of filling points each having a flowmeter and an actuator is present; and wherein the control unit is connected to the plurality of flowmeters and the plurality of actuators of the plurality of filling points via the communication system.

11. The measuring arrangement according to claim 10, wherein the individual flowmeters at each filling point independently perform a method including the steps of:

starting the filling process;

calculating the current fill volume by integrating the measured flow measurement values by the computing unit of the flowmeter;

sending a fill message at defined time intervals with the current fill volume from the flowmeter to the control unit;

predicting the remaining time until the fill volume limit is reached by the computing unit of the flowmeter;

checking by the computing unit of the flowmeter whether the limit value of the fill volume is reached in time before the next fill message of the flowmeter is sent;

if the limit value of the fill volume is reached in time before the next fill message of the flowmeter is sent, sending an additional message with the limit value of the fill volume at a predicted time in time before the next fill message to the control unit; and ending the filling process by a control command from the control unit.

\* \* \* \* \*